UNITED STATES PATENT OFFICE.

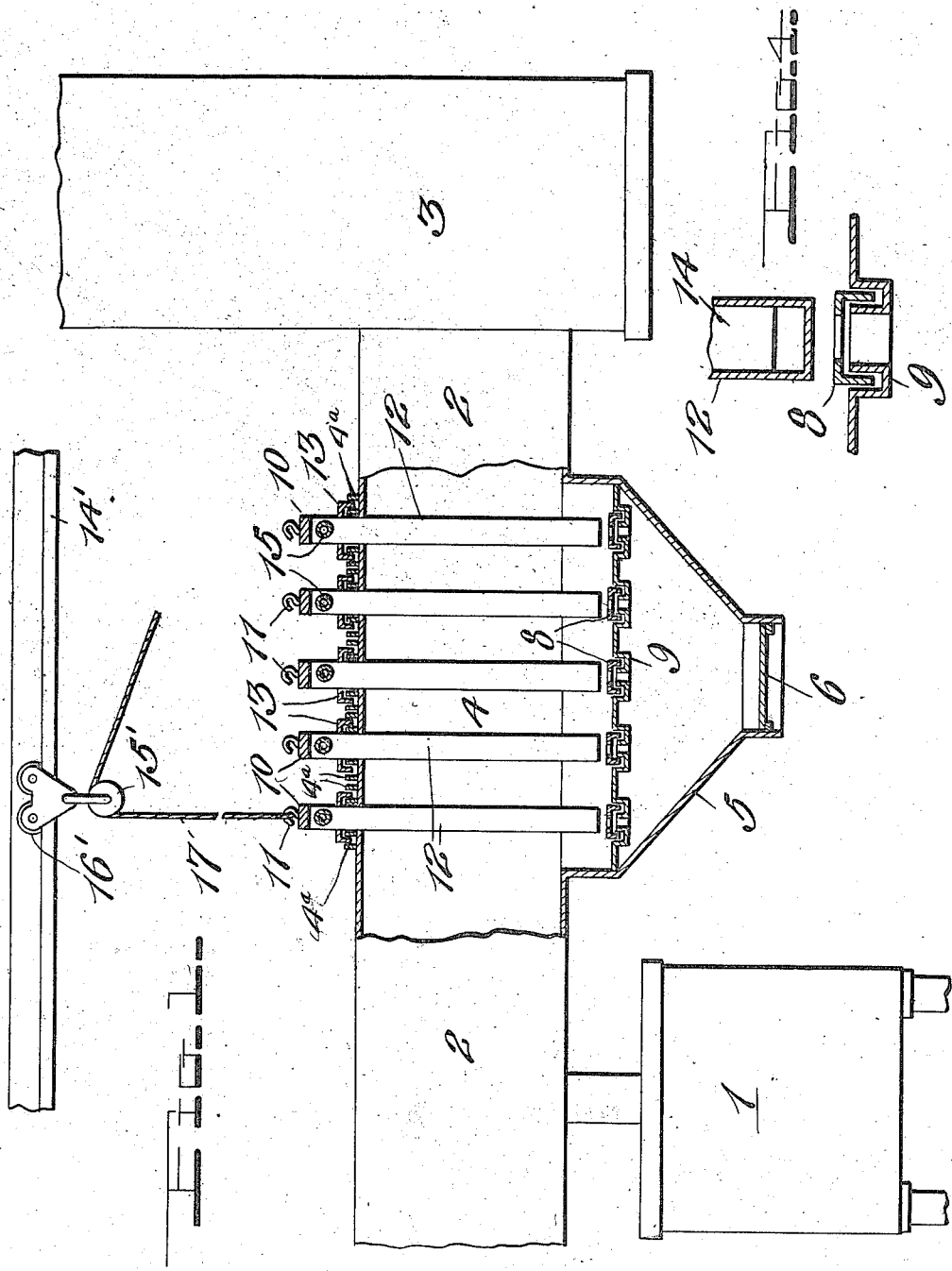

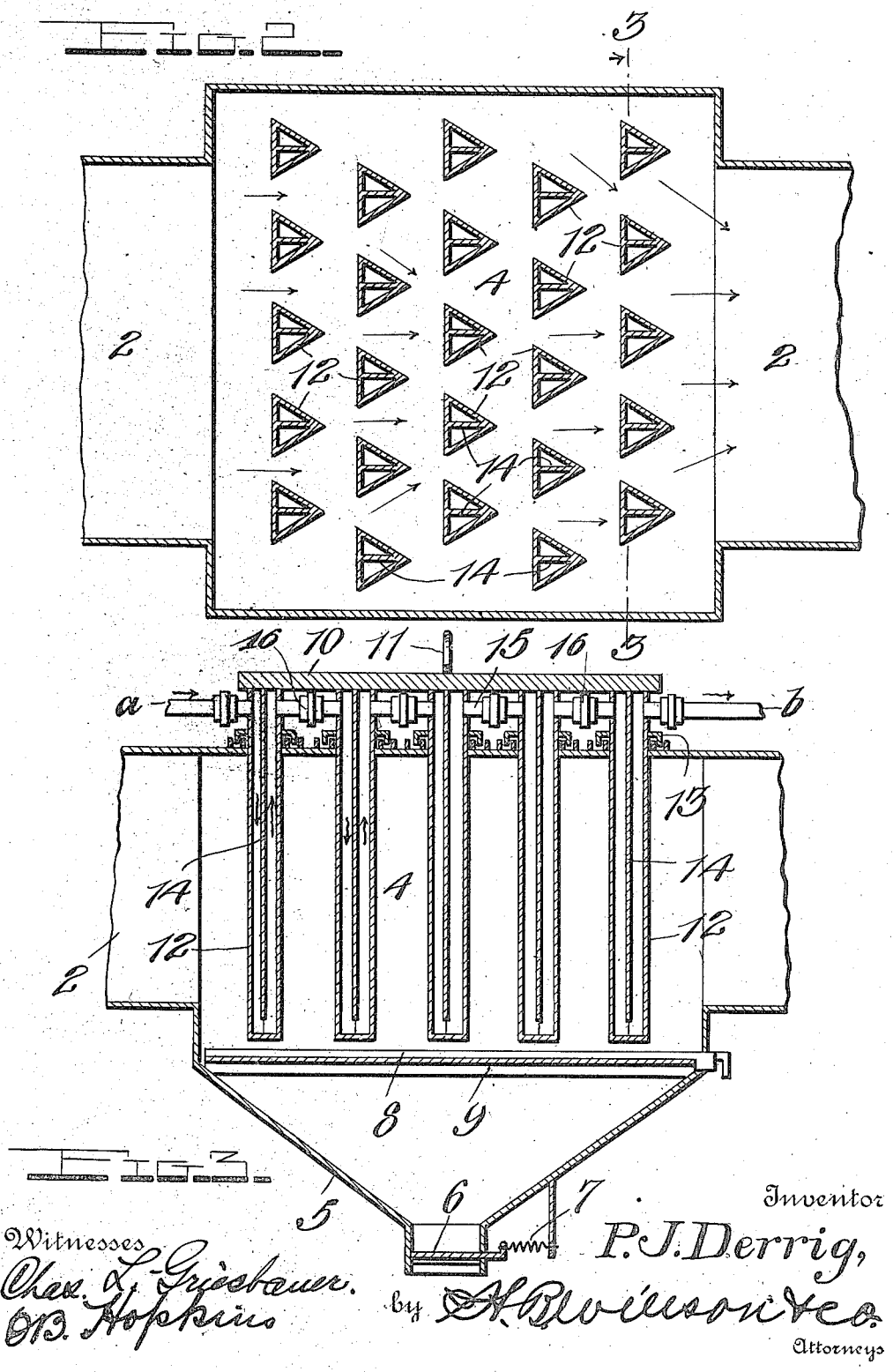

PATRICK J. DERRIG, OF NORTH WEYMOUTH, MASSACHUSETTS.

COMBINED DUST-ARRESTER AND GAS-COOLER.

997,762.

Specification of Letters Patent. Patented July 11, 1911.

Application filed September 26, 1910. Serial No. 583,890.

*To all whom it may concern:*

Be it known that I, PATRICK J. DERRIG, a citizen of the United States, residing at North Weymouth, in the county of Norfolk and State of Massachusetts, have invented certain new and useful Improvements in a Combined Dust-Arrester and Gas-Cooler; and I do declare the following to be a full, clear, and exact description of the invention, such as will enable others skilled in the art to which it appertains to make and use the same.

This invention relates to a combined dust arrester and gas cooler for use in flues between an ore roasting furnace and a Glover tower or contact chamber, and is an improvement over the dust arrester shown in my pending application, Serial No. 562,217, filed May 19, 1910.

The object of the invention is to provide a simply constructed dust arrester which will serve also as a gas cooler and which may be cheaply installed in a gas flue between an ore roasting furnace and a Glover tower or contact chamber, and it is so constructed as to collect all of the dust floating in the $SO_2$ gas.

Another object of the invention is to provide a device of this character which may be quickly cleaned without interfering with the operation of the system which will prevent any dust passing to the tower, which would cause oxidation of the nitrous compound contained therein.

With these and other objects in view, the invention consists of certain novel features of construction, combination and arrangement of parts as will be more fully described and particularly pointed out in the appended claim.

In the accompanying drawings:—Figure 1 represents a side elevation partly in longitudinal section of an apparatus embodying this invention; Fig. 2 is a horizontal section through the gas flue with this combined dust arrester and gas cooler applied thereto; Fig. 3 is a transverse section taken on the line 3—3 of Fig. 2, looking in the direction of the arrow; and Fig. 4 is a detail sectional view showing the lute arranged under the baffle plates.

In the embodiment illustrated, an ore roasting furnace 1 is shown having a flue 2 leading therefrom for conducting the $SO_2$ gas generated in the furnace to a Glover tower 3 or contact chamber, in which sulfuric acid is produced. This flue 2 is provided between the furnace 1 and the tower 3 with an enlarged chamber 4 having a hopper-like bottom 5 provided with a closure 6 which is preferably held in operative position by means of a coiled spring 7. The upper end of the hopper 5 is preferably provided with apertured sliding plates 8 which operate over an apertured plate 9 arranged below the baffle plates hereinafter to be described. These sliding plates are preferably constructed as shown in Fig. 4, and are designed to convey to a suitable place of deposit the products of condensation from the baffle plates.

This combined dust arrester and gas cooler is mounted in the chamber 4 and preferably comprises a plurality of transversely arranged bars as 10, provided on their upper faces with hooks, as 11, for a purpose to be described. A plurality of hollow baffle plates 12 depend from each of the bars 10 and are spaced longitudinally thereon any suitable or desired distances apart, the plates of the adjacent bars being arranged in staggered relation as shown in Fig. 2. These bars 10 which are arranged transversely of the chamber 4 above the top thereof are preferably provided with depending flanges 13 adapted to engage upwardly projecting flanges, as $4^a$, arranged on the top of the chamber 4 as is shown clearly in Fig. 1, and these flanges 13 are preferably luted, the lutes formed by the flanges being preferably filled with fine dust or other suitable material which prevents the escape of gas around the plates.

Each of the bars 10 may be provided with any desired number of baffle plates 12, five being here shown, which may be of any suitable or desired size and constructed of any desired shape in cross section, being here shown triangular in cross section, and each provided with a vertical partition 14 extending from the top to a point near the bottom thereof, dividing each baffle plate into an inlet and an outlet compartment to insure the circulation of the cooling fluid passing therethrough. The plates of each series are connected at their upper ends by pipes, as 15, which are provided with suitable couplings 16, as shown in Fig. 3. The water or other cooling fluid enters the pipe 15 at the point marked $a$ and flows in the direction of the arrows through the respective hollow baffle plates and out of the pipe at the opposite side of the flue at the point marked *b*, in Fig. 3. It will thus be obvious that each connected series of plates is provided with a separate inlet and outlet whereby fresh water is supplied to each series to produce the proper cooling action.

The baffle plates on one bar being arranged to alternate with those on the adjacent bars, as shown clearly in Fig. 2 provide for the thorough sifting and cooling of the gas passing between these plates and said plates operate to eliminate all of the dust from the gas passing through the chamber 4.

A track 14' is preferably supported above the flue 2 by any suitable means (not shown) and a pulley 15' is slidably mounted thereon, preferably by means of wheels 16'. A flexible hoisting element 17 operates over said pulley 15' and is provided at one end with any suitable means for engaging the hooks 11 of the bars 10 for raising the baffle plates carried by the respective bars above the flue when it is desired to clean them. When it is desired to clean these plates, each series connected with their respective bars 10 may be hoisted by means of the cable 17, as above described, and this upward movement causes the plates 12 to scrape on the side walls of the openings in the top of the flue, which cleans the dust from the plates and causes it to drop on the apertured sliding plates arranged above the hopper 5 from which it may be removed when necessary. The baffle plates being luted when lowered into operative position, the escape of gas around them is prevented.

From the foregoing description, it will be obvious that the $SO_2$ gas which is hot and full of dust when it leaves the furnace 1 is thoroughly sifted and cooled in its passage between the baffle plates 12 and enters the tower chambers or contact system 3 in a perfectly clean cooled condition.

From the foregoing construction taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

What I claim as my invention is:—

A combined dust arrester and gas cooler comprising a casing having an inlet at one end and an outlet at the other end, a plurality of series of connected hollow baffle plates triangular in cross section and arranged in said casing, each plate being provided with a vertical partition extending from the top to a point near the bottom thereof and each provided near its top with a fluid inlet communicating with the compartment formed at one side of said partition and with an outlet communicating with the compartment formed at the other side of said partition, the plates of adjacent series being arranged in staggered relation.

In testimony whereof I have hereunto set my hand in presence of two subscribing witnesses.

PATRICK J. DERRIG. [L. s.]

Witnesses:
HERBERT A. NEWTON,
GEORGE W. NEWCOMB.